US012798119B2

(12) United States Patent
Schaaf et al.

(10) Patent No.: US 12,798,119 B2
(45) Date of Patent: Nov. 17, 2026

(54) METHOD FOR HANDLING A GRIPPING OBJECT BY MEANS OF A HANDLING SYSTEM, AND HANDLING SYSTEM

(71) Applicant: J.Schmalz GmbH, Glatten (DE)

(72) Inventors: Walter Schaaf, Freudenstadt-Grüntal (DE); Matthias Frey, Sulz-Dürrenmettstetten (DE); Steffen Krieg, Waldenbuch (DE); Tobias Eberhardt, Glatten (DE)

(73) Assignee: J. Schmalz GmbH, Glatten (DE)

(*) Notice: Subject to any disclaimer, the term of this patent is extended or adjusted under 35 U.S.C. 154(b) by 215 days.

(21) Appl. No.: 18/919,784

(22) Filed: Oct. 18, 2024

(65) Prior Publication Data

US 2025/0128432 A1 Apr. 24, 2025

(30) Foreign Application Priority Data

Oct. 20, 2023 (DE) ..................... 10 2023 128 962.4

(51) Int. Cl.
*B25J 15/04* (2006.01)
*B25J 15/00* (2006.01)
*B25J 15/06* (2006.01)

(52) U.S. Cl.
CPC ........... *B25J 15/04* (2013.01); *B25J 15/0052* (2013.01); *B25J 15/0616* (2013.01); *B25J 15/0608* (2013.01)

(58) Field of Classification Search
None
See application file for complete search history.

(56) References Cited

U.S. PATENT DOCUMENTS

2007/0255447 A1 11/2007 Dunkmann et al.
2008/0174076 A1* 7/2008 Eisele ................ B65G 47/1421 279/3
2014/0072396 A1 3/2014 Rankin et al.
2019/0337163 A1 11/2019 Dunkmann et al.
(Continued)

FOREIGN PATENT DOCUMENTS

DE 10 2004 042 825 B3 1/2006
DE 10 2006 023 885 A1 10/2007
DE 10 2013 217 199 A1 4/2014
(Continued)

OTHER PUBLICATIONS

Tang, CN107088888A, "Quick changing device for robot clamp and workbench", Aug. 25, 2017, all pages. (Year: 2017).*

*Primary Examiner* — Michael S Lowe
(74) *Attorney, Agent, or Firm* — ASLAN LAW, P.C.

(57) ABSTRACT

A method (and a handling system) for handling a gripping object by a handling system that includes an end effector, a manipulator, and a coupling device for coupling and uncoupling the end effector to/from the manipulator, the method comprising gripping the gripping object the end effector, depositing the gripping object at a deposit location, and picking up the gripping object from a pickup location, wherein, for depositing the gripping object, the end effector is uncoupled from the manipulator so that the end effector remains on the gripping object, and wherein picking up the gripping object from the pickup location comprises coupling the end effector remaining on the gripping object to the manipulator.

17 Claims, 3 Drawing Sheets

(56) References Cited

U.S. PATENT DOCUMENTS

| | | | |
|---|---|---|---|
| 2021/0016404 A1 | 1/2021 | Ulrich et al. | |

FOREIGN PATENT DOCUMENTS

| | | | | |
|---|---|---|---|---|
| DE | 10 2018 106 210 A1 | | 9/2019 | |
| DE | 10 2018 110 741 A1 | | 11/2019 | |
| JP | H0538690 A | * | 2/1993 | ............ B25J 19/005 |
| JP | 5297362 B2 | * | 9/2013 | ............ B23K 11/11 |

* cited by examiner

METHOD FOR HANDLING A GRIPPING OBJECT BY MEANS OF A HANDLING SYSTEM, AND HANDLING SYSTEM

CROSS-REFERENCE TO RELATED APPLICATIONS

This application claims priority to DE Patent Application No. 10 2023 128 962.4 filed on Oct. 20, 2023, the entire contents of which are hereby incorporated by reference.

The invention relates to a method for handling a gripping object by means of a handling system comprising an end effector for gripping the gripping object, and a manipulator for moving the end effector. The invention also relates to such a handling system.

Handling systems are known from the prior art in a variety of ways and are, for example, used in production environments to transport workpieces between two storage locations or between a storage location and a processing machine. Such handling operations usually include gripping the workpiece (for example from a storage location), depositing the workpiece (for example at another storage location or at a processing station of a processing machine) and subsequently picking up the workpiece again (for example in order to feed it from the storage location to a packaging process or to feed it to a storage location after being processed in the processing machine).

When the workpiece is being picked up again, the problem often arises that the workpiece is no longer gripped at exactly the same position, which can lead to problems in certain application situations, for example if the workpiece is to go through a plurality of consecutive processing processes.

In order to address this problem, it was proposed to deposit the workpiece into a centering device or to use optical sensors to detect a contour or geometry of the workpiece in order to thus make it possible to positionally accurately pick up the workpiece. Alternatively, it is also known to hold the workpiece during a processing process by means of the manipulator and the end effector and for the manipulator to track a movement of the workpiece during the processing.

The known solutions are however either not very flexible or require complex control and monitoring by means of costly and maintenance-intensive sensors.

The invention addresses the object of positionally accurately picking up gripping objects in a simple and cost-effective manner.

This object is achieved according to the invention by a method with the features of the independent claim(s). This is a method for handling a gripping object by means of a handling system. The method is therefore also a method for operating a handling system.

The handling system comprises an end effector for gripping the gripping object. In particular, the end effector comprises a gripping device for gripping a gripping object. The handling system also comprises a manipulator, in particular a robot, for moving the end effector. The manipulator can be designed in different ways. The manipulator can be designed as a single- or multi-axis system. Preferably, the manipulator is designed as a robot. The handling system also comprises a coupling device for repeated, in particular automated, coupling and uncoupling the end effector to/from the manipulator. The coupling device is therefore, in particular, configured to repeatedly couple, uncouple and recouple the end effector to the manipulator. In other words, the end effector can be repeatedly coupled to the manipulator, uncoupled from the manipulator and recoupled to the manipulator via a coupling device, in particular in an automated manner.

According to the method, the gripping object is first gripped by means of the end effector. In so doing, the end effector is in particular coupled to the manipulator. In particular, the end effector for gripping the gripping object can be placed by the manipulator onto the gripping object, and a gripping effect of the end effector can then be activated.

After gripping the gripping object, the end effector and the gripping object gripped thereby are moved to a deposit location by means of the manipulator. The deposit location can, for example, be a processing station of a processing system or a storage location for the gripping object. The gripping object is then deposited at the deposit location. For this purpose, according to the invention, the end effector is uncoupled from the manipulator by means of the coupling device so that the end effector remains on the gripping object. According to the method, the gripping object and the end effector are therefore deposited together at the deposit location. In other words, depositing the gripping object at the deposit location comprises uncoupling the end effector from the manipulator by means of the coupling device such that the end effector remains on the gripping object. In particular, when the gripping object is being deposited, no relative movement takes place between the end effector and the gripping object.

In a further step, the gripping object is picked up from a pickup location by means of the manipulator. For this purpose, according to the invention, the end effector remaining on the gripping object is recoupled to the manipulator by means of the coupling device. Picking up the gripping object from the pickup location therefore comprises coupling the end effector remaining on the gripping object to the manipulator by means of the coupling device. In particular, picking up the gripping object thus does not comprise re-gripping the gripping object by means of the end effector.

In the proposed method, the gripping object and the end effector are therefore deposited together and picked up together. The end effector therefore remains in a defined position on the gripping object, for example while the gripping object is temporarily stored at a storage location, or while the gripping object is subjected to a processing process. In this way, the aforementioned problem of picking up the gripping object at the same position and in particular in the same orientation is solved in a structurally simple and reliable manner. Since the end effector is uncoupled from the manipulator when the gripping object is being deposited, the manipulator can be used for other tasks while the gripping object is deposited or being processed, which increases the overall efficiency of the handling system.

The gripping object can in particular be a workpiece.

The coupling device can in particular be designed for tool-free coupling and uncoupling of the end effector. The coupling device can be designed as quick coupling. If the manipulator is designed as a robot, the coupling device can in particular comprise a robot flange.

The pickup location can correspond to the deposit location 15 (for example, a storage location in a gripping object temporary storage). The pickup location can also be different from the deposit location. For example, the deposit location can be a feed location of a processing machine, and the pickup location can be an output location of the processing machine.

Between depositing the gripping object and picking up the gripping object, a work process can be carried out with the gripping object, or a processing process can be carried out on the gripping object. The method can therefore comprise carrying out a work process with the gripping object or carrying out a processing process on the gripping object between depositing the gripping object at the deposit location and picking up the gripping object from a pickup location. Carrying out the work process or processing process can comprise transferring the gripping object from the deposit location to a pickup location different from the deposit location.

It is conceivable that the end effector only rests on the gripping object after uncoupling (i.e., after the gripping object has been deposited). It is therefore conceivable that, at least for a time interval between depositing the gripping object (uncoupling the end effector from the manipulator) and picking up the gripping object (coupling the end effector to the manipulator), the gripping object is not actively gripped by the end effector. Such an embodiment saves energy and can in particular be advantageous if the gripping object is not moved or is only moved slightly between depositing and picking up (for example in a warehouse).

Preferably, however, a gripping effect of the end effector on the gripping object is maintained even between depositing the gripping object and picking up the gripping object, in particular for the entire duration. The gripping object is thus preferably gripped by the end effector even in the uncoupled state of the end effector. In this way, the gripping object and the end effector are fixed relative to one another, which reduces the risk of an undesired detachment of the end effector from the gripping object, for example in the course of moving the gripping object or a force acting on the gripping object during a processing process.

In the present context, "coupled state" means that the end effector is coupled to the manipulator by means of the coupling device. In the present context, "uncoupled state" means that the end effector is uncoupled from the manipulator, i.e., the coupling device is in particular detached.

The end effector can be designed in different ways. The end effector can comprise a magnetic gripping device, in particular a magnetic gripper. The end effector can comprise a mechanical gripping device, in particular a finger gripper or clamp. The end effector can comprise an adhesion gripper, in particular a Gecko gripper. The end effector can also comprise a passive gripper. The end effector can comprise a vacuum gripping device, in particular a suction gripper, further in particular a surface suction gripper. The end effector can comprise a plurality of gripping devices. The end effector can comprise combinations of the described gripping devices.

It is conceivable that a gripping effect of the end effector can be passively maintained even in the uncoupled state, for example if the end effector is designed as a magnetic gripper with a permanent magnet or as a mechanical gripper. However, it is also conceivable that maintaining a gripping effect in the uncoupled state requires an energy supply to the end effector, for example if the end effector is designed as a magnetic gripper with an electromagnet (electrical energy) or as a vacuum gripper (operating energy in the form of negative pressure, positive pressure, or electrical energy).

The end effector can be supplied with operating energy via a primary energy supply both in the coupled state and in the uncoupled state. In this case, "operating energy" means an energy supply of the end effector required to grip a gripping object. In the present context, the term "operating energy" can in particular include both electrical energy and energy in the form of compressed air or negative pressure.

As part of an advantageous development, the end effector in the coupled state can be connected to a supply line for supplying the end effector with operating energy, wherein the supply line remains connected, in particular permanently, to the end effector in the uncoupled state of the end effector (in particular between depositing the gripping object and picking up the gripping object). Such an embodiment makes it possible in a structurally simple and cost-effective manner to supply the end effector with operating energy (for example, power or negative pressure/positive pressure) even in the uncoupled state. The supply line can comprise an electrical line and/or a fluidic line, in particular a negative pressure line or a positive pressure line. The supply line can be part of the handling system. The handling system can therefore comprise a supply line connected to the end effector for supplying the end effector with operating energy. The supply line can be separated from the manipulator in terms of movement.

As part of an alternative embodiment, the end effector in the coupled state can be supplied with operating energy via a primary energy supply (for example, power supply, negative pressure supply, and/or positive pressure supply) and, in the uncoupled state, can be supplied with operating energy via a secondary, in particular independent, auxiliary energy supply. The auxiliary energy supply is in particular designed for independently operating the end effector. The auxiliary energy supply can in particular be provided by an auxiliary energy supply device arranged on the end effector. Such an embodiment makes it possible to operate the end effector independently so that a gripping effect can be maintained even during longer uncoupled phases.

As part of an advantageous embodiment, the end effector can comprise an energy storage device for independently operating the end effector. The energy storage device is in particular designed to supply the end effector with operating energy, in particular in the form of electrical energy or compressed air. The energy storage device can be a power storage device (for example, battery or capacitor). The energy storage device can be a pressure storage device (for example, negative pressure storage device or positive pressure storage device). The energy storage device can be designed to store mechanical energy (for example, a spring). The energy storage device can be part of an auxiliary energy supply device described above.

As part of a particularly preferred embodiment, the end effector comprises a vacuum gripping device for gripping the gripping object by means of negative pressure, or is designed as a vacuum gripping device. In particular, the end effector comprises a suction gripper for sucking a gripping object.

As part of an advantageous development, the vacuum gripping device of the end effector in the coupled state can be supplied with negative pressure from a primary negative pressure supply and, in the uncoupled state (i.e., after the uncoupling of the end effector from the manipulator, in particular after the deposition of the gripping object), can be supplied with negative pressure from a secondary auxiliary negative pressure supply. In the coupled state, the end effector can be supplied with negative pressure via the auxiliary negative pressure supply in addition to the primary negative pressure supply.

In particular, the end effector can comprise a secondary auxiliary negative pressure supply device which is in particular designed for independently generating and/or providing auxiliary negative pressure. The auxiliary negative pressure supply device can be activated only in the uncoupled state. The auxiliary negative pressure supply device can also be activated in the coupled state in addition to the primary negative pressure supply.

As part of an advantageous development, the auxiliary negative pressure supply device can comprise a negative pressure generating device. This can, for example, be a pneumatic ejector, an electric pump, or a negative pressure storage device with a pump. Advantageously, the auxiliary negative pressure supply device can comprise an energy storage device for operating the negative pressure generating device. This energy storage device can, for example, be a compressed air storage device (for example for operating a pneumatic ejector) or a battery (for example for operating an electric negative pressure generating device). In principle, it is also conceivable that the negative pressure generating device is supplied with operating fluid (in particular compressed air) or electrical energy via a supply line in the uncoupled state of the end effector.

It is also conceivable that the auxiliary negative pressure supply device comprises a negative pressure storage device for (independently) supplying the vacuum gripping device with negative pressure. The negative pressure storage device can in particular be dimensioned to compensate for leakage between the negative pressure generating device and the gripping object in the uncoupled state of the end effector.

As part of an alternative advantageous development, the vacuum gripping device of the end effector can be supplied with negative pressure in the coupled state and in the uncoupled state via the same negative pressure supply.

This can be realized, for example, by supplying the end effector in the coupled state with negative or positive pressure via a fluid line, wherein the fluid line remains connected to the end effector in the uncoupled state of the end effector, i.e., a connection between the fluid line and the end effector is not disconnected when the end effector is being uncoupled or the gripping object is being deposited. The end effector can therefore be supplied with negative or positive pressure via the same fluid line both in the coupled state and in the uncoupled state. Such an embodiment makes it possible to supply the end effector with energy in a structurally simple and energy-efficient manner. The handling system can therefore comprise a fluid line connected to the end effector for supplying the vacuum gripping device with negative or positive pressure. In particular, the fluid line is separated from the manipulator in terms of movement.

As mentioned above, the end effector can comprise a plurality of, in particular different, gripping devices. As part of an advantageous development, the end effector can comprise a vacuum gripping device, in particular a suction gripper, and additionally an auxiliary gripping device. In such an embodiment, it can in particular be provided that the gripping object is gripped by the auxiliary gripping device in the uncoupled state of the end effector, i.e., after uncoupling the end effector from the manipulator. This can be done alternatively or in addition to a gripping effect provided by the vacuum gripping device. It is therefore conceivable that, in the uncoupled state of the end effector, the gripping object is gripped (at least for a certain time interval) exclusively by the auxiliary gripping device. It is also conceivable that, in the uncoupled state of the end effector, the gripping object is gripped (at least for a certain time interval) by both the vacuum gripping device and the auxiliary gripping device. The auxiliary gripping device can be activated while gripping the gripping object and in particular when moving the gripping object by means of the manipulator. The auxiliary gripping device can also be activated during or after uncoupling the end effector. For example, it is conceivable that the auxiliary gripping device is activated only if a pressure level in the vacuum gripping device is undershot or exceeded. An embodiment with an auxiliary gripping device makes it possible to reliably maintain a gripping effect even in the uncoupled state. For example, the auxiliary gripping device can compensate for a possible loss of gripping force of the vacuum gripping device in the uncoupled state (for example as a result of leakage between the vacuum gripping device and the gripping object).

It is particularly advantageous if the auxiliary gripping device is designed as a passive gripping device, i.e., it in particular exerts a gripping effect on the gripping object without the supply of operating energy. In particular, the auxiliary gripping device can be a mechanical or magnetic gripping device. The end effector can therefore comprise a vacuum gripping device and a magnetic gripping device. Alternatively, the end effector can comprise a vacuum gripping device and a mechanical gripping device.

The aforementioned object is also achieved by a handling system that is configured to perform the method described above. The handling system comprises a manipulator, in particular a robot, an end effector for gripping a gripping object, and a coupling device for repeatedly coupling and uncoupling the end effector to/from the manipulator. The advantages and optional features described above with respect to the method can also be used to design the handling system so that reference is made to the above disclosure in this respect in order to avoid repetitions.

The handling system preferably also comprises a control device for controlling the manipulator and in particular the coupling device. The control device is in particular configured to carry out one of the methods described above. In particular, the control device comprises a non-volatile data storage device on which control instructions are stored, in particular saved, which, in particular when being executed by a data processing system of the control device, cause the control device to carry out one of the above-described methods.

As part of an advantageous development, the end effector can comprise an energy storage device for supplying the end effector with operating energy. The energy storage device can in particular be designed for independently operating the end effector. The energy storage device can, for example, be a pressure storage device or a battery.

As part of an advantageous development, the end effector can comprise a vacuum gripping device, in particular a suction gripper.

As part of an advantageous development, the end effector can comprise an auxiliary negative pressure supply device. The auxiliary negative pressure supply device is in particular designed for independently generating and/or providing negative pressure.

As part of an advantageous development, the auxiliary negative pressure supply device can comprise a negative pressure generating device. This can, for example, be a pneumatic ejector, an electric pump, or a negative pressure storage device with a pump. Advantageously, the auxiliary negative pressure supply device can comprise an energy storage device for operating the negative pressure generating device.

As part of an advantageous embodiment, the auxiliary negative pressure supply device can comprise an electrically operated negative pressure generating device and a power storage device, in particular a battery, for independently operating the negative pressure generating device. As part of an alternative advantageous embodiment, the auxiliary negative pressure supply device can comprise a pneumatically operated negative pressure generating device and a pressure storage device, in particular a compressed air storage device, for independently operating the negative pressure generating device.

The advantages and optional features of the auxiliary negative pressure generating device described above with respect to the method can also be used to design the handling system, in particular independently of a specific method.

The invention also relates to an end effector for use in a handling system described above. The advantages and optional features described above with respect to the handling system can be used to design the end effector.

The invention is explained in more detail below with reference to the figures.

In the following description and in the figures, identical reference signs are in each case used for identical or corresponding features.

Figure 1:
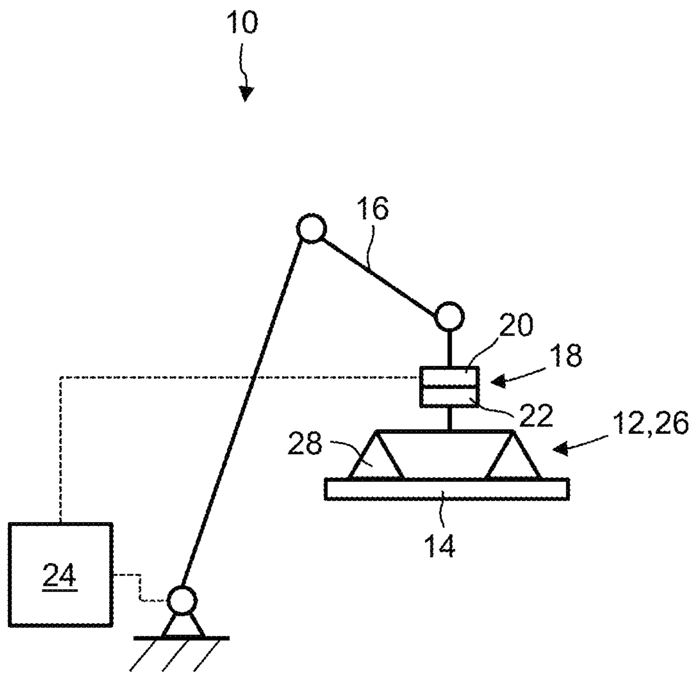
FIG. 1 is a simplified schematic representation of an embodiment of a handling system.

FIG. 1 shows, in a simplified schematic representation, an exemplary embodiment of a handling system which is denoted as a whole by reference sign 10.

The handling system 10 comprises an end effector 12 for gripping a gripping object 14 and a manipulator 16 for moving the end effector 12.

The end effector 12 is connected to the manipulator 16 via a coupling device 18. The coupling device 18 is designed to repeatedly couple, uncouple and recouple the end effector 12, in particular in an automated manner. As shown schematically in FIG. 1, the coupling device 18 in the example comprises a manipulator-side coupling portion 20 and an end-effector-side coupling portion 22. The manipulator-side coupling portion 20 and the end-effector-side coupling portion 22 can in particular be connected to one another via a repeatable, in particular automated, closable, detachable and reclosable connecting device. For example, the coupling device 18 can be designed as a quick coupling.

The handling system 10 also comprises a control device 24 which is designed to control the manipulator 16. The control device 24 is in particular also designed to control the coupling device 18. The control device 24 can also be designed to control the end effector 12. As mentioned above, the control device 24 preferably comprises a non-volatile data storage device (not shown) on which control instructions for the control device 24 are stored.

In the example according to FIG. 1, the end effector 12 is designed as a vacuum gripping device 26, specifically as a suction gripper with a plurality of suction bodies 28. As mentioned above, however, the invention is not limited to an embodiment of the end effector 12 as a vacuum gripping device 26. In embodiments (not shown), the end effector 12 can also comprise any other (for example, magnetic, mechanical or passive) gripping devices. Further exemplary embodiments of the end effector 12 are explained below with reference to FIGS. 3 to 6.

The manipulator 16 is preferably designed as a robot. For example, the manipulator 16 can be a 6-axle robot. It is also possible that the manipulator 16 comprises only one driven axle, for example a linear axle.

In the following, an exemplary method for handling a gripping object 12 by means of the handling system 10 is described with reference to FIG. 2. However, the method is not limited to the specific embodiment of the handling system 10 according to FIG. 1.

In an initial state (block 100 in FIG. 2), the end effector 12 is coupled to the manipulator 16 by means of the coupling device 18 (coupled state), and a gripping object 14 is held by the end effector 12. For this purpose, the end effector 12 can be previously placed onto the gripping object 14 by means of the manipulator 16, and the gripping object 14 can then have been gripped with the end effector 12 (not shown separately in FIG. 2).

In a further step (block 102 in FIG. 2), the end effector 12 and the gripping object 14 gripped thereby are moved by means of the manipulator 16 to a desired deposit location 30, for example a storage location or a processing station of a processing machine, and deposited there.

Figure 2:
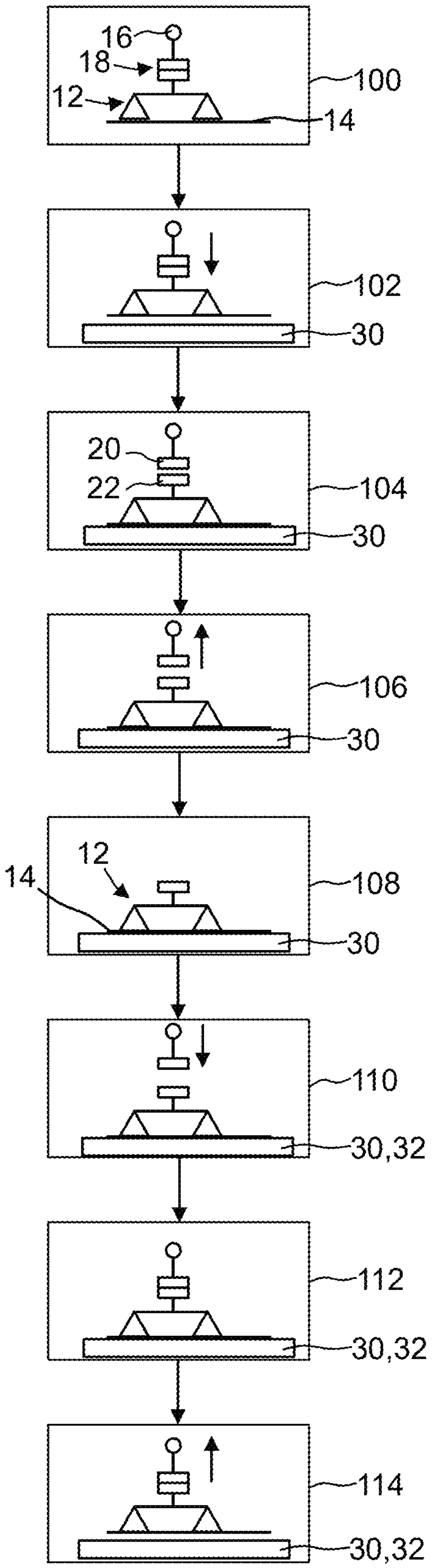
FIG. 2 is a flowchart for explaining an exemplary method for handling a gripping object with the handling system according to FIG. 1.

The end effector 12 is then uncoupled from the manipulator 16 by means of the coupling device 18 (block 104 in FIG. 2). As indicated in block 106 in FIG. 2, the manipulator 16 can now optionally move away from the deposit location 30, for example in order to couple another end effector 12.

The end effector 12, together with the gripping object 14, remains at the deposit location 30 (see block 108 in FIG. 2).

Preferably, a gripping effect of the end effector 12 is maintained even in the uncoupled state of the end effector 12; the gripping object 14 thus continues to be gripped by the end effector 12 (explained in more detail below). However, it is also conceivable that the end effector 12 is only placed onto the gripping object 14 in the uncoupled state.

If the gripping object 14 is to be picked up again, the manipulator 16 is moved to the storage location again (block 110 in FIG. 2), and the end effector 12 is recoupled to the manipulator 16 by means of the coupling device 18 (block 112 in FIG. 2).

The end effector 12 (and the gripping object 14 held thereby) can then be moved by the manipulator 16 (block 114 in FIG. 2), for example to another storage location or to a processing machine.

In the method outlined above by way of example, the deposit location 30 at which the gripping object 14 is deposited, and the pickup location at which the gripping object 14 is gripped again (i.e., the end effector 12 is recoupled to the manipulator 16), are identical. The deposit location 30 is thus simultaneously a pickup location 32.

However, as mentioned above, the pickup location 32 can also be different from the deposit location 30. For example, it is conceivable that the deposit location 30 is a feed location of a processing machine and that, after being deposited at this feed location, the gripping object 14 is subjected to a processing process (i.e., between steps 108 and 110 in FIG. 2), in the course of which the gripping object 14 is brought to a pickup location 32 different from the deposit location 30 (for example, an output location of the processing machine).

As mentioned above, it is advantageous if the end effector 12 exerts a gripping effect on the gripping object 14 even in the uncoupled state.

However, in the exemplary embodiment of the end effector 12 as a vacuum gripping device 26, pressure losses, for example due to leakage between a sealing lip of the vacuum gripping device 26 and the gripping object 14, can however lead to a reduction in the gripping force, even to a loss of the gripping force.

Figure 3:
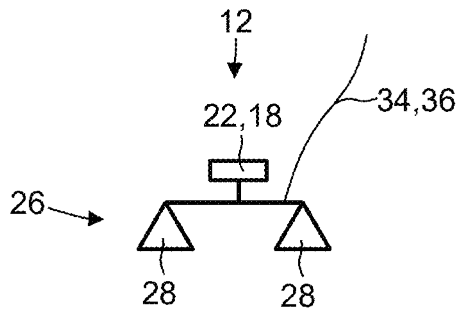
FIG. 3-6 are simplified schematic representations of various embodiments of an end effector.

In order to counteract this, it is conceivable that the end effector 12 is connected both in the coupled state and in the uncoupled state to a supply line 34, via which the vacuum gripping device 26 can be supplied with operating energy (for example, electrical energy or operating fluid, in particular negative pressure or positive pressure) (cf. FIG. 3). The supply line 34 is thus not also uncoupled while uncoupling the end effector 12 from the manipulator 16.

In the shown example, the supply line 34 is designed as a fluid line 36 for supplying the vacuum gripping device 26 with negative pressure. The fluid line 36 is in particular fluidically connected to an external, i.e., separate from the end effector 12, negative pressure generating device.

Figure 4:
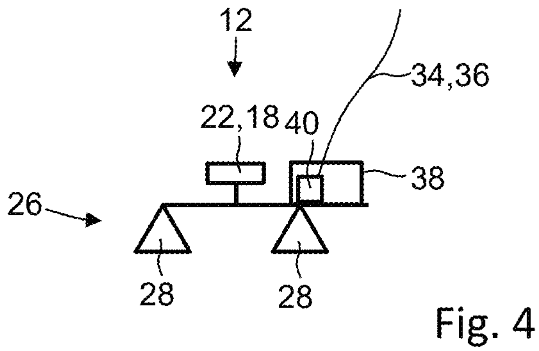

It is also possible for the end effector 12 to comprise an auxiliary negative pressure supply device 38 which is designed to supply the end effector 12 with negative pressure in the uncoupled state (cf. FIG. 4). The auxiliary negative pressure supply device 38 can in particular comprise a negative pressure generating device 40.

As shown by way of example in FIG. 4, the negative pressure generating device 40 can be supplied with operating energy via a supply line 34. For example, the negative pressure generating device 40 can be designed as a pneumatic ejector for generating negative pressure from positive pressure. Then the supply line 34 can be a fluid line 36 for supplying the negative pressure generating device 40 with compressed air (for example via an external compressed air supply). It is also conceivable that the negative pressure generating device 40 is designed as an electrically operated pump. Then the supply line 34 can be an electrical supply line (power line).

Figure 5:
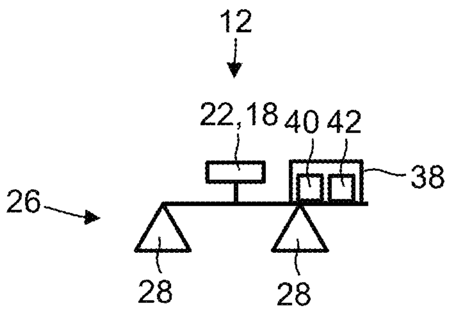

FIG. 5 shows a further exemplary embodiment in which the auxiliary negative pressure supply device 38 comprises an energy storage device 42 for independently supplying the negative pressure generating device 40 with operating energy. Given a design of the negative pressure generating device 40 as a pneumatic ejector, the energy storage device 42 can, for example, be a compressed air storage device. Given a design of the negative pressure generating device 40 as an electrically operated pump, the energy storage device 42 can, for example, be a battery.

Figure 6:
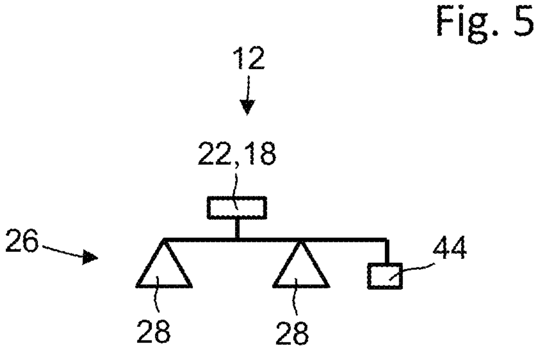

FIG. 6 shows a further exemplary embodiment of an end effector 12 which comprises an auxiliary gripping device 44 in addition to the vacuum gripping device 26. The auxiliary gripping device 44 is designed to grip the gripping object 14, in addition to or alternatively to the vacuum gripping device 26, in particular in the uncoupled state of the end effector 12.

Preferably, the auxiliary gripping device 44 is a passive gripping device, in particular a mechanical or magnetic gripping device. The auxiliary gripping device 44 can in particular be activated after the end effector 12 has been uncoupled from the manipulator 16 (step 104 in FIG. 2). This can take place immediately upon uncoupling or, for example, only if a predetermined pressure level in the vacuum gripping device 26 is exceeded or undershot (for example, upon exceeding a critical negative pressure at which reliable gripping of the gripping object 14 by the vacuum gripping device 26 is no longer guaranteed).

The invention claimed is:

1. A method for handling a gripping object by a handling system including an end effector for gripping the gripping object, a manipulator for moving the end effector, and a coupling device for, automated, coupling and uncoupling of the end effector to/from the manipulator, the method comprising:

gripping the gripping object by the end effector;
depositing the gripping object at a deposit location;
picking up the gripping object from a pickup location,
wherein for depositing the gripping object, the end effector is uncoupled from the manipulator so that the end effector remains on the gripping object,
wherein, for picking up the gripping object from the pickup location, the end effector remaining on the gripping object is recoupled to the manipulator, and
wherein, after the gripping object has been deposited at a deposit location and the end effector has been uncoupled from the manipulator, the end effector rests on and is supported by the gripping object.

2. The method according to claim 1, wherein, between depositing the gripping object and picking up the gripping object, the gripping object continues to be gripped by the end effector.

3. The method according to claim 1, wherein the end effector in a coupled state is connected to a supply line for supplying the end effector with operating energy, wherein the supply line remains connected to the end effector in an uncoupled state of the end effector.

4. The method according to claim 3, wherein the end effector in the coupled state is supplied with operating energy via a primary energy supply, and wherein the end effector in the uncoupled state is supplied with operating energy via a secondary, independent, auxiliary energy supply.

5. The method according to claim 3, wherein the end effector comprises a vacuum gripping device or a suction gripper.

6. The method according to claim 5, wherein the vacuum gripping device in the coupled state is supplied with negative pressure by a primary negative pressure supply, wherein the end effector comprises an auxiliary negative pressure supply device, wherein the end effector in the uncoupled state is supplied with negative pressure by the auxiliary negative pressure supply device.

7. The method according to claim 6, wherein the end effector comprises an auxiliary gripping device or a mechanical or magnetic gripping device, in addition to the vacuum gripping device, wherein the gripping object in the uncoupled state is gripped by the auxiliary gripping device, and wherein, in the coupled state of the end effector, the gripping object is gripped, exclusively, by the vacuum gripping device.

8. The method according to claim 1, wherein the end effector comprises an energy storage device for independently operating the end effector.

9. A handling system for performing the method according to claim 1, the handling system comprising:

the end effector for gripping the gripping object,
the manipulator for moving the end effector,
the coupling device for, automated, coupling and uncoupling of the end effector to/from the manipulator,
a control device cooperating with the manipulator and the coupling device which is designed to perform the method according to claim 1.

10. The handling system according to claim 9, wherein the end effector comprises an energy storage device for independently operating the end effector.

11. The handling system according to claim 9, wherein the end effector comprises a vacuum gripping device or a suction gripper.

12. The handling system according to claim 11, wherein the end effector comprises an auxiliary gripping device for gripping the gripping object, or mechanical or magnetic gripping device, in addition to the vacuum gripping device.

13. The handling system according to claim 9, wherein the end effector comprises an auxiliary negative pressure supply device for, independently, generating and/or providing negative pressure.

14. The handling system according to claim 13, wherein the auxiliary negative pressure supply device comprises an electrically operated negative pressure generating device, wherein the auxiliary negative pressure supply device comprises a battery for operating the negative pressure generating device.

15. The method according to claim 1, wherein the end effector comprises a vacuum gripping device, a magnetic gripping device and/or and adhesion gripper.

16. A handling system comprising:

an end effector for gripping a gripping object, a manipulator or moving the end effector, a coupling device for, automated, coupling and uncoupling of the end effector to/from the manipulator, a control device cooperating with the manipulator and the coupling device which is designed to perform a method for handling the gripping object by the handling system including the end effector for gripping the gripping object, the manipulator for moving the end effector, and the coupling device for, automated, coupling and uncoupling of the end effector to/from the manipulator, comprising:

gripping the gripping object by the end effector;

depositing the gripping object at a deposit location;

picking up the gripping object from a pickup location, wherein for depositing the gripping object, the end effector is uncoupled from the manipulator so that the end effector remains on the gripping object, wherein, for picking up the gripping object from the pickup location, the end effector remaining on the gripping object is recoupled to the manipulator, and wherein, after the gripping object has been deposited at a deposit location and the end effector has been uncoupled from the manipulator, the end effector rests on and is supported by the gripping object.

17. The handling system according to claim 16, wherein the end effector comprises a vacuum gripping device, a magnetic gripping device and/or and adhesion gripper.

* * * * *